Sept. 17, 1946.        E. W. BRUNDAGE        2,407,811
HOIST
Filed Jan. 24, 1945
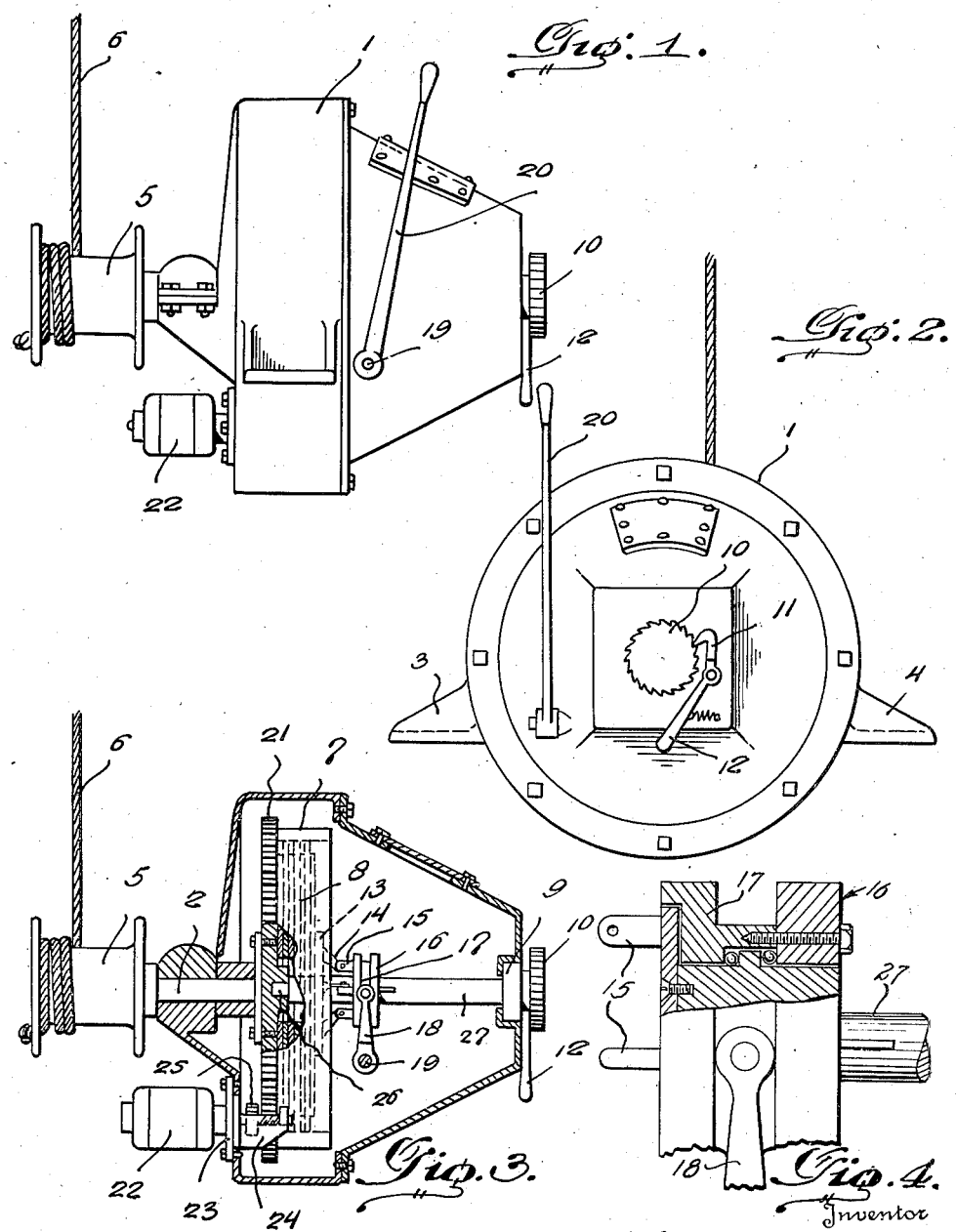
Inventor
Ellis W. Brundage, Patented Sept. 17, 1946

2,407,811

UNITED STATES PATENT OFFICE 2,407,811

HOIST

Ellis W. Brundage, Sheridan, Mont.

Application January 24, 1945, Serial No. 574,272

3 Claims. (Cl. 254—187)

This invention relates to electric hoists, and more particularly to portable hoists adapted to be used with vehicles equipped with a storage battery.

A main object of this invention is to provide a portable hoist of simple construction which will provide safe and positive action combined with ease in operation, and which is especially adapted to be mounted on a light truck, tractor or other desired vehicle.

Further objects of the invention will become apparent from the following description and claims and from the accompanying drawing, wherein:

Figure 1 is an elevational view of an electric hoist in accordance with this invention.

Figure 2 is a rear end elevational view of the electric hoist of Figure 1.

Figure 3 is a longitudinal sectional view of the hoist of Figure 1.

Figure 4 is an enlarged detail sectional view, showing the clutch shifting structure.

Referring to the drawing, 1 designates a housing for the hoist mechanism. Said housing is provided with a pair of mounting feet 3 and 4 adapted to support the housing on a pair of correspondingly spaced appropriate pedestals provided on the supporting surface of the vehicle. Journaled at one end of the housing 1 is a shaft 2 carrying a drum 5 secured to its outer end, said drum 5 being provided with a hoist cable 6 wound thereon. The inner portion of shaft 2 carries a flywheel and clutch housing member 7 containing clutch disc elements 8.

Journaled between the opposite end wall of housing 1, wherein a bearing 9 is provided therefor, and an axial bearing recess 26 provided in the inside wall of clutch housing member 7 is a shaft 27 extending outside of housing 1 and carrying a ratchet wheel 10 secured thereto. The driving disc components of clutch disc elements 8 are secured to fly-wheel member 7 whereas the driven disc components of said clutch elements 8 are secured to shaft 27. When disc elements 8 are pressed together shaft 27 will be connected to flywheel 7. Cooperating with ratchet wheel 10 is a spring biased pawl member 11, adapted to allow shaft 27, to rotate in a forward direction but to lock said shaft against rearward rotation. An arm 12 is provided on pawl member 11 and an appropriate tension spring connects arm 12 to housing 1.

The clutch discs 8 are pressed together by an annular plate 13 carried by fingers 14 which are connected to fingers 15 projecting from the inner sleeve of a bearing assembly 16. The inner sleeve of bearing assembly 16 is keyed to shaft 27 for longitudinal movement thereon. The outer sleeve of bearing 16 is formed to thrust the inner sleeve along shaft 27 to urge plate 13 against clutch discs 8, appropriate anti-friction elements being provided between said inner sleeve and said outer sleeve to permit rotation of shaft 27 with respect to said outer sleeve. Said outer sleeve of bearing 16 is provided with a peripheral groove 17. Groove 17 is engaged by an appropriate follower lug on an arm 18 secured to a shaft 19 journaled in the walls of housing 1. Shaft 19 extends outside of housing 1 and an external operating lever 20 is rigidly secured to the end thereof. It is apparent that by pulling on operating lever 20, arm 18 will cause thrust bearing 16 to force clutch plate 13 inwardly to press the clutch disc elements 8 together and rotatably connect shaft 27 to flywheel 7.

Flywheel 7 is provided with an integral peripheral gear element 21. An electric motor 22 adapted to be driven from a storage battery is mounted on an appropriate bracket 23 at the lower portion of housing 1. The armature shaft of motor 22 extends into housing 1 beyond gear 21 and is journaled in a cradle-shaped bearing member 24. Said armature shaft is provided with a thread which is engaged by a correspondingly threaded bore provided in a pinion gear 25 carried on said armature shaft and arranged so that when motor 22 is driven from a storage battery of the correct polarity, pinion 25 will be moved by said armature shaft into mesh with gear 21 and will thereafter drive gear 21.

Motor 22 is connected by appropriate conductors to the vehicle storage battery and an appropriate control switch is provided therefor. By closing the circuit, motor 22 will be actuated to thereby drive gear 21 and flywheel 7 to thereby rotate hoist drum 5 and provide hoisting power at cable 6.

Reverse movement of gear 21, with motor 22 disconnected, will automatically disengage pinion 25 from gear 21 and will thus have no harmful effect on motor 22.

The thread on the armature shaft of motor 22 extends only for a length sufficient to allow pinion 25 to move into meshing engagement with gear 21 when motor 22 is driven in the correct direction of rotation. The end of the thread thus provides an abutment means for maintaining the pinion 25 in engagement with driven gear 21 during hoisting operation of motor 22.

In operation, after the load has been lifted the operator engages clutch elements 8 by exerting a pull on lever 20 while the hoist is still operating. Forward rotation of shaft 27 is permitted by pawl 11 under these conditions. When it is desired to lower the load, motor 22 is deenergized and the operator may drop the load by relaxing his pull on lever 20. Under these conditions rearward rotation of shaft 27 is not permitted due to the locking action of pawl 11 on ratchet wheel 10. Lever 20 may therefore be employed to brake the rearward rotation of shaft 2, and the lowering of the load, by controlling the pressure applied to clutch disc elements 8.

While a specific embodiment of a portable hoist has been disclosed in the foregoing description, it will be understood that various modifications within the spirit of the invention will occur to those skilled in the art. Therefore, it is intended that no limitations be placed on the invention other than as defined by the scope of the appended claims.

What is claimed is:

1. A hoist comprising a first horizontal shaft carrying at one end a drum for winding a hoist cable and at the other end a flywheel member, a clutch housing, said first shaft being journaled at an intermediate portion thereof in a first wall of said clutch housing, a second horizontal shaft aligned with said first shaft and journaled at one end in said flywheel member and at the other end in a second wall of said clutch housing, said second shaft carrying a ratchet element, pawl means on said clutch housing arranged to allow rotation of said second shaft only in a cable winding direction of said first shaft when said first and second shafts are coupled together, said flywheel member being provided with a first clutch element, said second shaft being provided with a second clutch element secured thereto to cooperate with said first clutch element to rotatably connect said second shaft to said flywheel member, means for moving said second clutch element into operative engagement with said first clutch element, gear means formed on the periphery of said flywheel, driving means for said gear means, said driving means comprising an electric motor mounted on said clutch housing, the shaft of said motor being horizontal and parallel with said first shaft of the hoist, said motor shaft extending into the housing beyond the plane of said flywheel, the inwardly extending portion of said motor shaft being threaded, a pinion member threadedly engaged with said motor shaft and adapted to be moved into meshing engagement with said gear means upon actuation of said motor by a source of electric power of definite polarity, abutment means maintaining said pinion member in meshing engagement with said gear means during operation of said motor, said definite polarity of the power source being such as to rotate said motor shaft to produce rotation of said first hoist shaft in the winding direction of said hoist cable.

2. The structure of claim 1, and wherein the means for moving said second clutch element into operative engagement with said first clutch element comprises a thrust bearing member having an inner sleeve keyed to said second shaft for longitudinal movement thereon and carrying means for exerting a force on said second clutch element to press it against said first clutch element, and an outer sleeve on said inner sleeve, anti-friction members being provided between said inner sleeve and said outer sleeve, and actuating means for moving said outer sleeve.

3. The structure of claim 1, and wherein the inwardly extending motor shaft is supported at its inner end by a bearing member secured to a wall of said housing and wherein said abutment means for maintaining said pinion member in meshing engagement with said gear means during operation of said motor is formed by terminating the thread on said motor shaft at a point on said shaft sufficient to allow said pinion member to be moved into meshing engagement with said gear upon rotation of said motor shaft.

ELLIS W. BRUNDAGE.